(12) United States Patent
Keutner et al.

(10) Patent No.: US 10,216,152 B2
(45) Date of Patent: Feb. 26, 2019

(54) METHOD AND APPARATUS FOR PARAMETERIZING A SAFETY DEVICE (75) Inventors: Konstantin Keutner, Neubiberg (DE); Wolfgang Trumler, Uttenreuth (DE); Michael Klotzbach, Neureut (DE)

(73) Assignee: Siemens Aktiengesellschaft, Munich (DE)

( * ) Notice: Subject to any disclaimer, the term of this patent is extended or adjusted under 35 U.S.C. 154(b) by 1132 days.

(21) Appl. No.: 13/992,575

(22) PCT Filed: Nov. 16, 2011

(86) PCT No.: PCT/EP2011/070244
§ 371 (c)(1),
(2), (4) Date: Jun. 7, 2013

(87) PCT Pub. No.: WO2012/079902
PCT Pub. Date: Jun. 21, 2012

(65) Prior Publication Data
US 2013/0261772 A1    Oct. 3, 2013

(30) Foreign Application Priority Data
Dec. 13, 2010 (DE) .................. 10 2010 062 908

(51) Int. Cl.
G05B 9/02 (2006.01)
G05B 19/042 (2006.01)
H04L 12/24 (2006.01)

(52) U.S. Cl.
CPC ........... G05B 9/02 (2013.01); G05B 19/0425 (2013.01); H04L 41/0869 (2013.01);
(Continued)

(58) Field of Classification Search
CPC ...................................... G05B 9/02
(Continued)

(56) References Cited

U.S. PATENT DOCUMENTS 4,213,038 A * 7/1980 Silverman .............. G06K 19/14
235/381
5,521,588 A * 5/1996 Kuhner ..................... G06F 8/65
340/12.28
(Continued)

FOREIGN PATENT DOCUMENTS

CN    1745371     3/2006
CN    101416129   4/2009
(Continued)

OTHER PUBLICATIONS

Harle et al, EP1662346A2, "Method for secure parametrisation of a field device in automation technology", published on May 31, 2006.*
(Continued)

*Primary Examiner* — Thomas C Lee
*Assistant Examiner* — Alan Chu
(74) *Attorney, Agent, or Firm* — Cozen O'Connor (57) ABSTRACT

A method and apparatus for parameterizing a device with parameters from a parameter list, wherein in an event of a match occurring between an external parameter token calculated externally based on the parameter list, and an internal parameter token calculated internally by the device to be parameterized based on the parameter list, an external device token input into the device is compared with an internal device token, which is calculated internally by the device to be parameterized based on a device ID for the device and the internal parameter token to validate the parameter list such that fast and reliable parameterization of a device, particularly a safety critical device, which is provided in an industrial installation or a vehicle, is achieved.

15 Claims, 3 Drawing Sheets

(52) U.S. Cl.
CPC .............. *G05B 2219/21081* (2013.01); *G05B 2219/23165* (2013.01); *G05B 2219/23213* (2013.01); *G05B 2219/23406* (2013.01); *G05B 2219/25428* (2013.01); *G05B 2219/31103* (2013.01); *G05B 2219/31131* (2013.01); *Y02P 90/18* (2015.11); *Y04S 40/162* (2013.01)

(58) Field of Classification Search
USPC .......................................................... 700/79
See application file for complete search history.

(56) References Cited

U.S. PATENT DOCUMENTS

| | | | | |
|---|---|---|---|---|
| 6,317,701 | B1* | 11/2001 | Pyotsia | G05B 19/4185 340/8.1 |
| 7,246,193 | B2 | 7/2007 | Rotvold et al. | |
| 8,306,658 | B2* | 11/2012 | Kilian | G05B 19/4185 700/19 |
| 8,307,210 | B1* | 11/2012 | Duane | H04L 9/0897 380/42 |
| 8,694,787 | B2* | 4/2014 | Niglio | H04L 63/0428 380/247 |
| 2004/0148513 | A1* | 7/2004 | Scott | G05B 19/042 726/26 |
| 2006/0253277 | A1 | 11/2006 | Behringer | |
| 2007/0005963 | A1* | 1/2007 | Eldar | G06F 21/6209 713/168 |
| 2007/0245119 | A1* | 10/2007 | Hoppe | G06F 17/30262 711/216 |
| 2008/0034216 | A1* | 2/2008 | Law | H04L 9/3273 713/183 |
| 2008/0312877 | A1* | 12/2008 | Keese | G05B 19/042 702/183 |
| 2009/0196227 | A1 | 8/2009 | Bahr | |
| 2010/0180130 | A1* | 7/2010 | Stahl | G06F 21/10 713/193 |
| 2011/0040960 | A1* | 2/2011 | Deierling | G06Q 20/1235 713/2 |
| 2012/0235479 | A1* | 9/2012 | Seiler | G05B 19/042 307/11 |

FOREIGN PATENT DOCUMENTS

| | | | | |
|---|---|---|---|---|
| CN | 101507206 | | 8/2009 | |
| DE | 102004037064 | A1 | 2/2006 | |
| DE | 102004057298 | A1 | 6/2006 | |
| DE | 102005025645 | A1 | 12/2006 | |
| DE | 102008001886 | A1 | 11/2009 | |
| EP | 1662346 | * | 5/2006 | ........... G05B 19/042 |
| WO | WO 2005101146 | A1 | 10/2005 | |
| WO | WO 2007110006 | A1 | 10/2007 | |
| WO | WO 2007121141 | A2 | 10/2007 | |

OTHER PUBLICATIONS

Birgel, DE102008001886, "Procedures for the exchange of parametrization and configuration data between a configuration or management system and a field device", published Nov. 26, 2009.*
Espacenet Translation of EP1662346.*

* cited by examiner

FIG. 3

METHOD AND APPARATUS FOR PARAMETERIZING A SAFETY DEVICE

CROSS-REFERENCE TO RELATED APPLICATIONS

This is a U.S. national stage of application No. PCT/EP2011/070244 filed 16 Nov. 2011. Priority is claimed on German Application No. 10 2010 062 908.1 filed 13 Dec. 2010, the content of which is incorporated herein by reference in its entirety.

BACKGROUND OF THE INVENTION

1. Field of the Invention

The invention relates to a method and apparatus for parameterizing a device, i.e., a safety-critical device, which is located, for example, in an industrial installation in a power station or in a vehicle.

2. Description of the Related Art

Devices are in many cases to be configured, where, in many applications, device parameters are input into the device for its configuration. For the parameterizing of devices, particularly safety-critical devices that are used for the measuring and monitoring of safety-critical installations, systems or processes, special safety requirements apply. With such devices, the parameters that are input must be checked in a validation phase by an operator or user. The parameters that are input are in this situation displayed, for example, on a display of the safety-critical device that is to be parameterized. An operator or user can then go through a parameter list in his possession item by item, where the parameter list contains the parameter ID's and parameter values that correspond to the parameters, and compare them with the parameters being displayed. If the parameters being displayed match the parameters shown on the parameter list, then the operator or user can confirm, for example, by his signature on an inspection record, that the parameter values displayed and validated by him correspond to the specified parameter values, and that, in addition, the correct safety-critical device has been parameterized in the appropriate manner.

This conventional procedure does, however, present a number of disadvantages. A parameter list for a complex device can comprise a plurality of device parameters, such that it is in part extremely laborious for an operator or user to work through the corresponding parameter list parameter by parameter, and to validate every parameter value individually. In addition to this, account must be taken of the fact that an operator or user who is performing the necessary validation of the parameter list will in many cases be in an environment that is dangerous or damaging to health to perform the parameterization. In addition, safety-critical devices that are to be parameterized, such as in industrial installations, are often only accessible by an operator or user with difficulty.

A further disadvantage lies in the fact that a parameterization or re-parameterization of a device with this conventional procedure requires a long period of time, especially if the parameter list comprises a plurality of parameters with corresponding parameter values. In many cases, it is also necessary for a parameterization and/or reparameterization of a device to be concluded within a specified period of time, in particular with regard to safety-critical applications. In these cases, the conventional procedure for parameterizing may, under certain circumstances, take too long.

SUMMARY OF THE INVENTION

It is therefore an object of the invention to provide a method and apparatus for the parameterizing of a device with parameters of a parameter list which avoids the above disadvantages, and which, in particular, guarantees a fast and reliable parameterizing of the device.

This and other objects and advantages are achieved in accordance with the invention by a method for parameterizing a device with parameters from a parameter list, where, in the event of a match between an external parameter token, calculated externally based on the parameter list, and an internal parameter token calculated internally by the device to be parameterized based on the parameter list, a device token input into the device is compared with an internal device token that is calculated internally by the device to be parameterized based on a device ID for the device and the internal parameter token, in order to validate the parameter list.

The method according to the invention offers the advantage that the parameter validation is simplified, and only one single check sum or, respectively, one single calculated token needs to be validated, instead of all the parameter values of the parameters listed in the parameter list.

In an embodiment of the method according to the invention, the external device token is calculated externally based on a device ID contained in the parameter list and the external parameter token.

In a further possible embodiment of the method according to the invention, both the parameter tokens are calculated via a predetermined calculation function based on parameter ID's and parameter values of the parameters contained in the parameter list.

In a further possible embodiment of the method according to the invention, the external parameter token is calculated via the predetermined calculation function by a calculation unit of an external parameterizing apparatus based on the parameter ID's and the parameter values of the parameters contained in the parameter list.

In a further possible embodiment of the method according to the invention, the internal parameter token is calculated via the predetermined calculation function by a calculation unit integrated in the device which is to be parameterized, on the basis of the parameter ID's and the parameter values of the parameters contained in the parameter list.

In a possible embodiment of the method according to the invention, the parameter list stored in an external data memory is read out from the data memory by the calculation unit of the parameterizing apparatus for the calculation of the external parameter token.

In a further possible embodiment of the method according to the invention, the parameter list stored in the data memory is read out, via an interface of the device which is to be parameterized, by the calculation unit integrated in the device which is to be parameterized for the calculation of the internal parameter token, and is temporarily stored in an internal memory of the device which is to be parameterized.

In a further possible embodiment of the method according to the invention, the external parameter token calculated by the calculation unit of the external parameterizing apparatus is displayed on a display of the parameterizing apparatus.

In a further possible embodiment of the method according to the invention, the internal parameter token calculated by the calculation unit integrated in the device which is to be parameterized is displayed on a display of the device which is to be parameterized.

In a further possible embodiment of the method according to the invention, both the parameter tokens displayed are compared by a user, who, if both the parameter tokens displayed match, inputs the device token calculated by the parameterizing apparatus into the device which is to be parameterized, which then compares the input device token with the internal device token to validate the parameter list.

In a further possible embodiment of the method according to the invention, the specified calculation function, which is used by the calculation units for the calculation of the parameter token, is a Cyclic Redundancy Check (CRC) function.

In a further possible embodiment of the method according to the invention, the specified calculation function, which is used by the calculation units for the calculation of the parameter tokens, is a hash function.

In a further possible embodiment of the method according to the invention, the calculation function can be adjusted or, respectively, configured.

It is also an object of the invention to provide a parameterizable device which, based on a parameter list that is read out from an external data memory, internally calculates an internal parameter token, which is output, where the parameterizable device compares a device token input into the device with an internal device token, which is calculated based on the previously calculated internal parameter token and a device ID of the device, in order to validate the parameter list.

The parameterizable device is, in particular, a safety-critical device of an installation, in particular an industrial installation, or of a vehicle, in particular of an aircraft or a railway locomotive.

The invention further provides for a parameterizing apparatus with the features specified in claim 13.

It is also an object of the invention to provide a parameterizing apparatus for the parameterizing of a device, where the parameterizing apparatus calculates, based on a stored parameter list, an external parameter token and a device token of the device which is to be parameterized, where the device token calculated by the parameterizing apparatus is input into the device which is to be parameterized if the external parameter token matches an internal parameter token, calculated internally by the parameterizing device based on the parameter list, in order to validate the parameter list.

In a possible embodiment of the paramaterizing apparatus according to the invention, this apparatus includes a calculation unit for the calculation of the external parameter token via a specified calculation function, based on the parameter ID's and parameter values of the parameters contained in the parameter list.

In a possible embodiment of the paramaterizing apparatus according to the invention, this calculation unit further serves to calculate a device token of the device which is to be parameterized, based on the external parameter token and a device ID of the device to be parameterized, contained in the parameter list.

In a possible embodiment of the paramaterizing apparatus according to the invention, this further includes a display, which is provided to display the calculated external parameter token and the calculated device token.

In a possible embodiment of the paramaterizing apparatus according to the invention, this includes a reader device, for reading out the parameter list stored on a data memory.

In a further possible embodiment of the paramaterizing apparatus according to the invention, this further includes a transfer facility for transferring the calculated device token to the device which is to be parameterized.

In a further possible embodiment of the paramaterizing apparatus according to the invention, the paramaterizing apparatus is a portable mobile paramaterizing device.

In a possible embodiment of the paramaterizing apparatus, this exhibits an interface for reading out the parameter list from a data carrier or data memory which can be connected to the interface.

In a possible embodiment, the paramaterizing apparatus further comprises a display for displaying the parameter token calculated based on the parameter list, as well as the device token calculated from this, for a user, where the user, if the parameter token displayed matches with a parameter token output by the device which is to be parameterized, manually enters the device token displayed into the device which is to be parameterized, in order to validate the parameter list.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Hereinafter, possible embodiments of the method according to the invention and of the apparatus according to the invention for the parameterizing of a device are described in greater detail, making reference to the appended figures, in which.

DETAILED DESCRIPTION OF THE PREFERRED EMBODIMENTS

Figure 1:
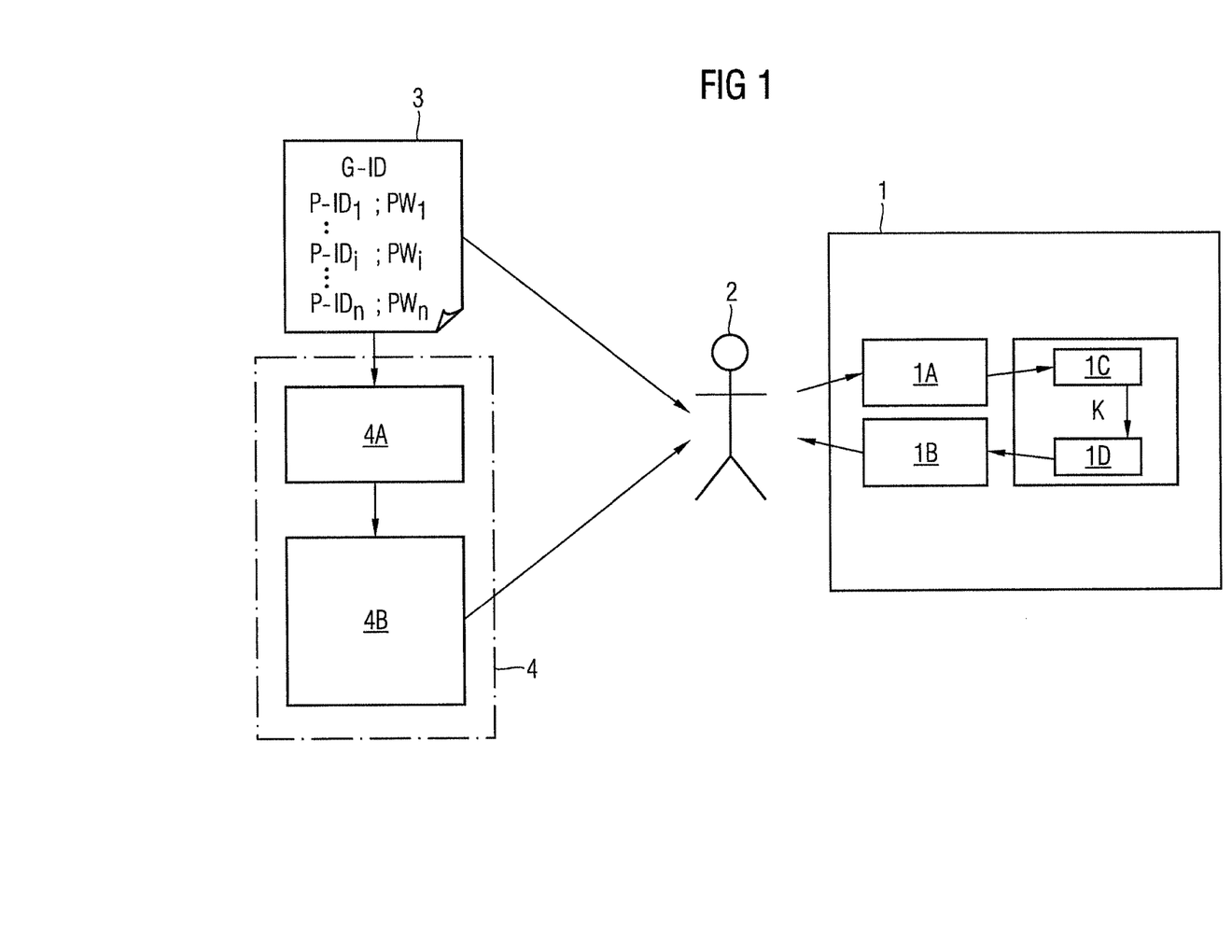
FIG. 1 a block circuit diagram to explain a first possible embodiment of a method and an apparatus for the parameterizing of a device according to the invention.

As can be seen from FIG. 1, a device 1 which is to be parameterized includes in the example shown an input unit 1A and an output unit 1B. The device 1 which is to be parameterized in the example shown is a safety-critical device, such as, a device in an industrial installation or a vehicle, such as an aircraft or a railway locomotive. In the example shown, the safety-critical device 1 includes a safety-critical core K, located in which is an embedded data memory 1C, such as a RAM memory, and an embedded calculation unit 1D, which forms an embedded validator. The device 1, as represented in FIG. 1, can be a fixedly installed device, such as, a safety-critical device of an industrial installation or a mobile device, such as a vehicle, in particular an aircraft or a railway locomotive. The safety-critical device 1 can be configured with parameters or, respectively, device parameters, in a specific operation or operational mode respectively. The embedded data memory 1C provided in the safety-critical core K can, in this situation, store a parameter list PL, read out from a data carrier 3, which is provided for the respective device 1. After the parameterizing of the device 1, the input parameter list PL must then be validated by a user 2 or an operator, in order to avoid any erroneous settings.

To do this, the user 2 is provided with the parameter list PL, which can be located on a data carrier 3. This parameter list PL can, for example, be printed out and referred to by the user for the validation. The parameter list PL comprises the parameter ID's of all the parameters of the device 1 which are to be parameterized, as well as the specified parameter values pertaining to it. The parameters can be any desired device parameters. For example, the parameters provide physical limit values or setting values for an earth current, a volume, density, and the like. Further examples are setting values for controlled variables such as current or voltage.

In addition to the parameter ID's and the parameter values pertaining to them, the parameter list PL also includes an unambiguous device ID, G-ID, of the device 1 which is to be parameterized. The parameter list PL can, in one possible embodiment, be located on a data memory 3, which can be read out by the safety-critical device 1 via an interface. In one possible embodiment, this stored parameter list PL is read out and initially stored in the data memory 1C of the device 1 as an embedded parameter list PL'. After the parameter list PL' has been written into the memory 1C, for security reasons the user 2 must validate the parameter list PL' which has been transferred. It is additionally possible for the user 2 to print out the parameter list PL stored in the data memory 3.

For the purpose of automatically validating the transferred parameter list PL', the user 2 is provided with a parameterizing apparatus 4, which can be a portable parameterizing device. The parameterizing apparatus 4 likewise contains a calculation unit 4A and, in the example presented, is provided with a display 4B. With the method according to the invention, for the parameterizing of the device 1 with parameters from the parameter list PL by the calculation unit 4A of the parameterizing apparatus 4, an external parameter token $PT_{EXTERN}$ is calculated externally, i.e., outside the safety-critical device 1, based on the parameter list PL, which can be displayed on the display 4B of the parameterizing apparatus 4 to the user 2. In addition, an internal parameter token $PT_{INTERN}$ is calculated by the calculation unit 1D integrated in the device 1 which is to be parameterized, based on the transferred or input parameter list PL', which is temporarily stored in the embedded data memory 1C. This internally-calculated parameter token $PT_{INTERN}$ can be displayed to the user 2 via the output unit 1B of the device 1, for example, via a display of the device 1 which is to be configured. If the externally calculated parameter token $PT_{EXTERN}$, which is displayed, for example, on the display 4B of the parameterizing apparatus 4, matches the internally calculated parameter token $PT_{INTERN}$, which is displayed, for example, on a display 1B of the device 1 which is to be parameterized, then the user 2 can input a device token GT into the safety-critical device 1 to validate the parameter list PL', such as via the input unit 1A. In a preferred embodiment, this input device token is calculated externally, such as by the calculation unit 4A of the parameterizing apparatus 4, based on the device ID, G-ID, contained in the parameter list PL and the previously calculated external parameter token $PT_{EXTERN}$.

$GT_{EXTERN}=f(G\text{-}ID,PT_{EXTERN})$

In a possible embodiment, this externally calculated device token $GT_{EXTERN}$ is displayed to the user 2 on the display 4B of the parameterizing apparatus 4. Provided that the two parameter tokens, i.e., the parameter token $PT_{EXTERN}$ calculated externally by the parameterizing apparatus 4 and the parameter token $PT_{INTERN}$ calculated internally by the device 1 which is to be configured, match one another, the user 2 then, in order to validate the parameter list PL', enters the externally-calculated device token $GT_{EXTERN}$ displayed to him into the device 1 which is to be configured. The calculation unit in provided in the safety-critical device 1 then calculates an internal device token $GT_{INTERN}$ based on a device ID, G-ID, of the device 1 and of the previously calculated internal parameter token $PT_{INTERN}$.

$GT_{INTERN}=f(G\text{-}ID,PT_{INTERN})$

This internal device token $GT_{INTERN}$ is compared with the externally-calculated and input device token $GT_{EXTERN}$ in order to validate the parameter list PL'. Provided that the internal device token $GT_{INTERN}$ matches with the external device token $GT_{EXTERN}$, it is ensured that the parameter list PL', which is located in the embedded data memory 1C of the device 1, is correct, and matches entirely with the external parameter list PL stored in the data carrier 3.

The two calculation units 4A, 1D, which are located respectively in the parameterizing apparatus 4 and the safety-critical device 1, may be microprocessors. The two parameter tokens, i.e., the external parameter token $PT_{EXTERN}$ and the internal parameter token $PT_{INTERN}$, are calculated separately by the two calculation units 4A, 1D, via the same specified calculation function BF based on the parameter ID's, P-ID, and the parameter values P-W of the parameters P contained in the parameter list PL.

$PT=BF(P\text{-}ID,P\text{-}W)$

In a possible embodiment, the calculation can be performed with a cryptographic algorithm with a high level of freedom from collision. In another possible embodiment, the calculation function BF, which is used by the calculation units to calculate the parameter tokens PT, is a Cyclic Redundancy Check (CRC) function. In addition, the specified calculation function BF can also be a hash function. Further calculation functions with a high degree of freedom from collision are likewise possible. In a possible embodiment, the calculation function BF used in the calculation unit 4A and in the internal calculation unit in are each configurable or adjustable respectively, and can therefore be changed by the user 2.

The external parameter token $PT_{EXTERN}$ is calculated via the specified calculation function BF by the calculation unit 4A of the parameterizing apparatus 4 based the parameter ID's, P-ID, and the parameter values P-W of the parameters P contained on the parameter list PL of the data carrier 3. The internal parameter token $PT_{INTERN}$ is calculated via the same specified calculation function BF by the calculation unit 1D integrated in the device 1 which is to be parameterized, based on the parameter ID's, P-ID, and the parameter values P-W of the parameters P contained in the parameter list PL', where the parameter list PL' temporarily stored in the embedded data memory 1C is used.

The original parameter list PL can be located in an external data memory, such as a data carrier 3. The data carrier 3 can, for example, be a USB dongle or memory stick. In a possible embodiment, the parameterizing apparatus 4 is provided with an interface for reading out the external data memory 3, in which the parameter list PL is located. For example, a USB dongle is plugged into an interface of the parameterizing apparatus 4, where, in a possible embodiment, the parameter list PL stored on it is then first displayed to the user 2 on the display 4B of the parameterizing apparatus 4. By the appropriate activation of the parameterizing apparatus 4, the user 2 then transfer the parameter list PL displayed to him, which derives from the data carrier 3 which is plugged in, via a data interface in the embedded memory 1C of the safety-critical device 1. This interface between the safety-critical device 1 and the parameterizing apparatus 4 can be a wireless or wire-bound data interface.

As soon as the temporary transfer of the parameter list has been concluded, the user 2 initiates the validation of the transferred parameter list PL'. The user 2 enters a command into the parameterizing apparatus 4 for the validation to be performed, where the parameterizing apparatus 4 automatically calculates, based on the parameter list PL available to it, the external parameter token $PT_{EXTERN}$ and the external device token $GT_{EXTERN}$. Separately from this, i.e., by another means, the calculation unit 1D provided in the security-critical device 1 calculates, based on the provisional parameter list PL' stored temporarily in the embedded data memory 1C, an internal parameter token $PT_{INTERN}$ and issues this to the user 2. The user 2 then compares the external parameter token $PT_{EXTERN}$ calculated by the parameterizing apparatus 4 with the internally-calculated parameter token $PT_{INTERN}$. If the two parameter tokens are identical, the user 2 then enters, preferably manually, the external device token $GT_{EXTERN}$ displayed to him on the display 4B into the safety-critical device 1, for example, via the input unit 1A, in order definitively to validate the temporarily stored parameter list PL'. Provided that the external device token $GT_{EXTERN}$ which is input matches with an internally-calculated device token $GT_{INTERN}$, that is calculated internally by the device 1 which is to be parameterized based on the device ID, G-ID of the device 1 and of the internal parameter token $PT_{INTERN}$, then the temporarily-stored parameter list PL' is correct and matches entirely with the external parameter list PL, where this can be displayed to the user 2, such as via a display 1B of the safety-critical device 1. In a further embodiment, the user 2 can input the externally-calculated device token $GT_{EXTERN}$ without a comparison of the parameter token PT into the safety-critical device 1 to conclude the validation of the temporarily-stored parameter list PL'. In a further possible embodiment, the successful validation is notified by the safety-critical device 2, via a wireless or wire-bound interface, to the parameterizing apparatus 4, which informs the user 2 of this by a corresponding display of the message on the display 4B. In the exemplary embodiment described above, the comparison between the two calculated parameter tokens PT and the input of the external device token $GT_{EXTERN}$ are performed by a user 2. This user 2, in the exemplary embodiment presented, is located in the vicinity of the safety-critical device 1 which is to be parameterized. In an alternative embodiment, with the method according to the invention, the parameterizing can be performed remotely, i.e., by an operator or user who is located at a distance.

Figure 2:
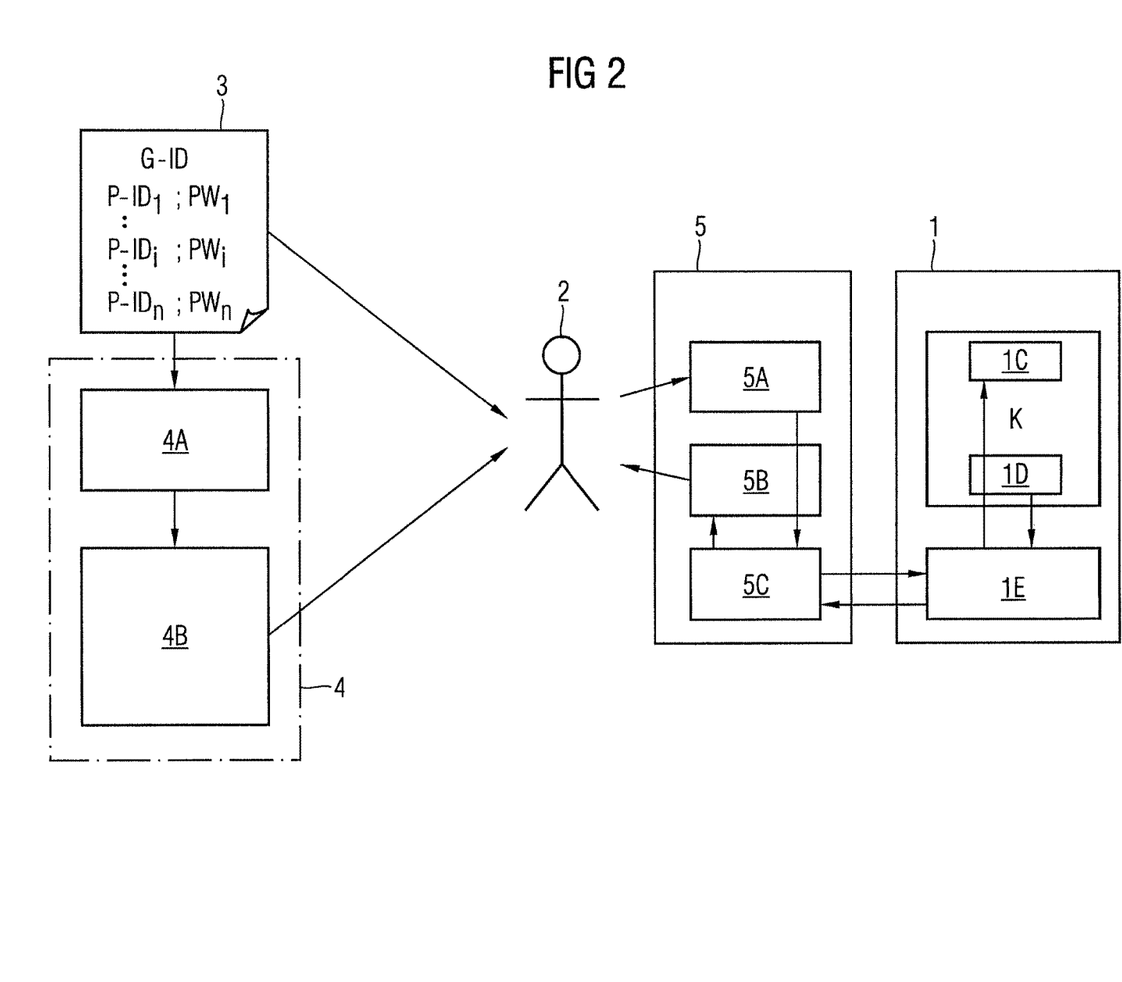
FIG. 2 a further block circuit diagram to explain a further possible embodiment of the method according to the invention and the apparatus according to the invention for the parameterizing of a device.

FIG. 2 shows an exemplary embodiment in which a safety-critical device 1 which is to be parameterized, with a safety-critical core K, is connected by a network interface 1E via a data network, a field bus, to a remote parameterizing interface facility 5. In a possible embodiment, the parameterizing interface facility 5 is integrated in the parameterizing apparatus 4. The parameterizing interface facility 5 is provided with an input unit 5A, an output unit 5B, and a network interface 5C, which is connected via the data network to the network interface 1E of the safety-critical device 1 which is to be parameterized. In this embodiment, the user 1, in order to read out the parameter list PL from the data carrier 3, first transfers this parameter list PL into the embedded memory area 1C of the safety-critical device 1. The internal parameter token $PT_{INTERN}$ calculated from this is transferred back to the parameterizing interface facility 5, and is output there via the output unit 5B. If the internally-calculated parameter token $PT_{INTERN}$ which is output is identical to the externally-calculated parameter token $PT_{EXTERN}$, the user 2 can then input the external device token $GT_{EXTERN}$ into the input unit 5A of the parameterizing interface facility 5, which is transferred via the network interfaces 5C, 1E to the safety-critical core K of the device 1. By the calculation unit 1D of the device 1, the external device token $GT_{EXTERN}$ is compared with the internally-determined device token $GT_{INTERN}$ in order to determine whether the parameter list PL', which is located in the embedded data memory 1C, is free of errors. If the validation can be successfully completed, the safety-critical device 1 transfers this information back via the network interface to the parameterizing interface facility 5B, which notifies the user 2 of the successful conclusion of the validation of the parameter list PL'. The method according to the invention therefore allows for reliable remote parameterization. In addition, the method according to the invention ensures that the correct device 1 has been parameterized with the corresponding parameter list PL which belongs to the device 1, and that no confusion with the parameter list PL' has occurred.

In the exemplary embodiments presented, the device 1 exhibits a safety-critical core K, the functional capability of which is ensured by special securing mechanisms, such as SIL, for example.

With the method according to the invention, by the complete detachment of the different test routes, potential sources of error such as can occur with the methods conventionally used hitherto are completely eliminated, such that the method according to the invention provides a very high degree of security in the parameterization of a device 1. The method according to the invention also offers the advantage that the user 2 need only enter one single value, namely the calculated external device token $GT_{EXTERN}$, into the safety-critical device 1 in order to validate the parameter list PL.

The device ID, G-ID, of the device 1, which is required for the calculation of the internal device token $GT_{INTERN}$, is available in the safety-critical device 1, internally secure with regard to manipulation. Because, with the parameterizing method according to the invention, the device ID is used in an integrated manner, it is additionally ensured with the method that in every case the correct device 1 is parameterized, and any risk of confusion is excluded. Accordingly, with the method according to the invention, it is also possible for the parameterization to be performed in a secure manner entirely remotely. With the method according to the invention the user 2 no longer imperatively has to be at the location at which the device 1 is to be parameterized. The method according to the invention even allows for the parameterizing to be performed via the field buses used conventionally in process and automation technology.

The parameterizing apparatus 4, as represented in the exemplary embodiments according to FIGS. 1 and 2, serves to parameterize the device 1. The parameterizing apparatus 4 can be a portable device. The parameterizing apparatus 4 calculates, based on the parameter list PL, the external parameter token $PT_{EXTERN}$ and an external device token $GT_{EXTERN}$ of the device 1 which is to be parameterized. In this situation, if the external parameter token $PT_{EXTERN}$ matches an internal parameter token $PT_{INTERN}$, calculated internally by the device 1 which is to be parameterized on the basis of the parameter list PL', then the device token calculated by the parameterizing apparatus 4 is input directly or remotely into the device 1 which is to be parameterized to validate the parameter list PL. In a further possible embodiment, the parameterizing apparatus 4 is a terminal or client computer, which is provided with an integrated parameterizing interface facility 5, which, via a data network, allows a remote data access to the safety-critical device 1 which is to be parameterized. The data network can be any desired network, such as a field bus, but may also be an open or public data network, such as the Internet. In a possible embodiment, for security reasons, in particular with the use of an open or public data network, cryptographic encoding mechanisms are used for the encoding of the data transferred via the data network. With this embodiment, the safety-critical device 1 which is to be parameterized and the parameterizing apparatus 4 belonging to it are connected to a shared public data network, such as the Internet, and the device 1 is parameterized remotely in a secure manner in accordance with the method according to the invention.

The connection between the network interface 5c and the network interface 1E of the safety critical device 1 can be wireless or wire-bound. In a possible embodiment, the communication occurs via satellites, in particular if the safety-critical device 1 is a mobile device, in particular a vehicle, such as an aircraft.

In a possible embodiment, for the parameterization or, respectively, re-parameterization, the device 1 which is to be parameterized is switched out of a normal operating mode into a parameterizing operating mode, before the method according to the invention for parameterizing the device 1 is performed. If the device 1 which is to be parameterized is not a safety-critical device, then, in a possible embodiment, the parameterization can also take place during normal operation of the device 1.

Figure 3:
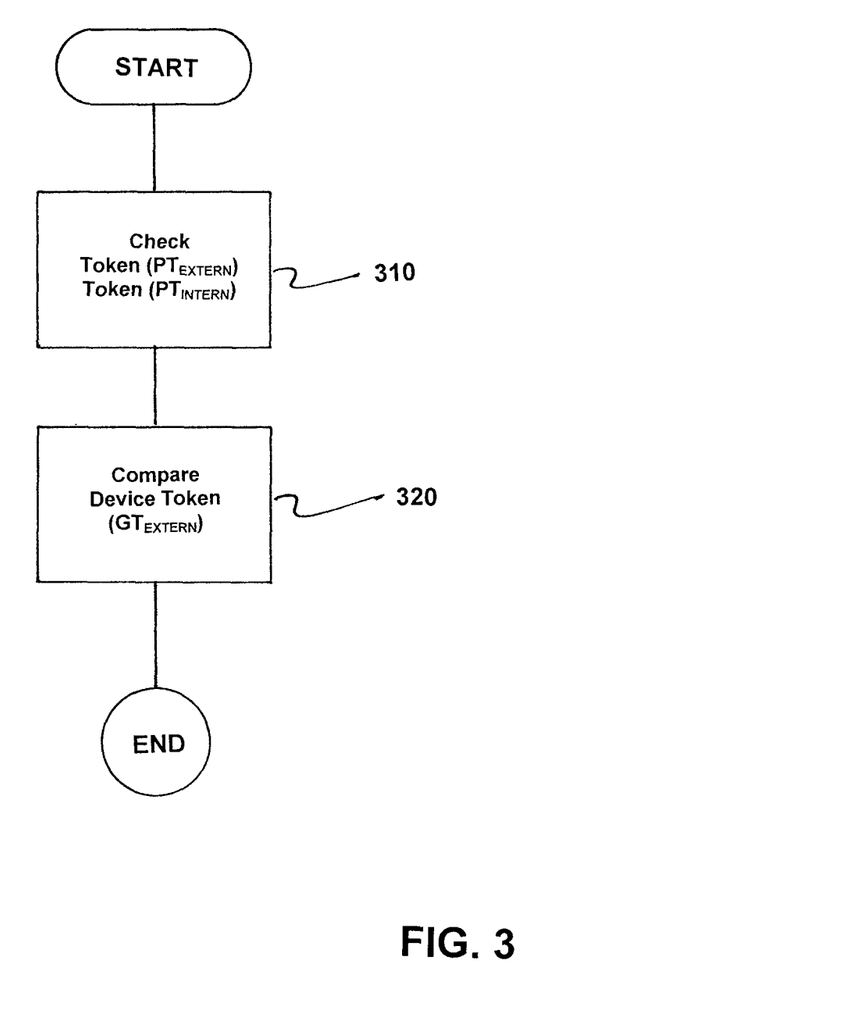
FIG. 3 is a flowchart of the method in accordance with the invention.

FIG. 3 is a flowchart of a method for parameterizing a device with parameters from a parameter list (PL). The method comprises checking to determine whether an external parameter token ($PT_{EXTERN}$) calculated externally based on the parameter list (PL) matches an internal parameter token ($PT_{INTERN}$) calculated internally by the device which is to be parameterized based on the parameter list (PL), as indicated in step 310.

A device token ($GT_{EXTERN}$) input into the device is then compared with an internal device token ($GT_{INTERN}$) calculated internally by the device which is to be parameterized based on a device ID (G-ID) of the device and the internal parameter token ($PT_{INTERN}$) to validate the parameter list (PL) in an event of a match between the external parameter token ($PT_{EXTERN}$) and the internal parameter token ($PT_{INTERN}$), as indicated in step 320.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for parameterizing a safety-critical device with parameters from a first parameter list which ensures parameterization and increases a speed at which the safety-critical device becomes parameterized, comprising:
   checking to determine whether an external parameter token calculated externally based on the first parameter list matches an internal parameter token calculated internally by the safety-critical device which is to be parameterized based on the first parameter list; and
   comparing a device token calculated externally and input into the safety-critical device with an internal device token calculated internally by the device which is to be parameterized based on a device ID of the device and the internal parameter token to validate the first parameter list in an event of a match between the external parameter token and the internal parameter token to ensure the parameterization of the safety-critical device occurs and to ensure the speed at which the safety-critical device becomes parameterized is increased;
   wherein the external device token is calculated externally based on a device ID contained in the first parameter list and the external parameter token;
   wherein the internal and external parameter tokens are calculated via a specified calculation function based on parameter ID's and parameter values of the parameters contained in the first parameter list; and
   wherein the first parameter list is stored on an external data carrier and is read out from the external data carrier, which is separate from an external parameterizing apparatus, by a first calculation unit of the external parameterizing apparatus for calculation of the external parameter token.

2. The method as claimed in claim 1, wherein the external parameter token is calculated, via the specified calculation function, the first calculation unit of the external parameterizing apparatus based on the parameter ID's and the parameter values of the parameters contained in the first parameter list.

3. The method as claimed in claim 2, wherein the internal parameter token is calculated, via the specified calculation function, a second calculation unit integrated in the safety-critical device which is to be parameterized based on the parameter ID's and the parameter values of the parameters contained in the first parameter list transferred to the safety-critical device.

4. The method as claimed in claim 3, wherein the first parameter list stored in the data memory is read out, via an interface of the safety-critical device which is to be parameterized, by the second calculation unit integrated into the safety-critical device which is to be parameterized to calculate the internal parameter token, and temporarily stored in an internal memory of the safety-critical device which is to be parameterized.

5. The method as claimed in claim 3, wherein the internal parameter token calculated by the second calculation unit integrated in the safety-critical device which is to be parameterized is displayed on a display of the safety-critical device which is to be parameterized.

6. The method as claimed in claim 5, wherein the internal parameter and external parameter tokens are compared by a user who, in an event of the match between the internal parameter and external parameter tokens displayed, enters the device token calculated by the external parameterizing apparatus into the safety-critical device which is to be parameterized, which compares the input device token with the internal device token to validate the first parameter list.

7. The method as claimed in claim 2, wherein the external parameter token calculated by the first calculation unit of the external parameterization apparatus is displayed on a display of the external parameterizing apparatus.

8. The method as claimed in claim 7, wherein the internal parameter and external parameter tokens are compared by a user who, in an event of the match between the internal parameter and external parameter tokens displayed, enters the device token calculated by the external parameterizing apparatus into the safety-critical device which is to be parameterized, which compares the input device token with the internal device token to validate the first parameter list.

9. The method as claimed in claim 7, wherein the specified calculation function, which is calculated by the first and second calculation units for calculation of the internal and external parameter tokens, is free from collisions.

10. The method as claimed in claim 7, wherein the specified calculation function is one of a Cyclic Redundancy Check (CRC) function or a hash function.

11. A parameterizable safety-critical device which is configured to, based on a first parameter list read out from an external data carrier, internally calculate an internal parameter token which is output by the safety-critical device, and compare an externally calculated device token, which is then input into the safety-critical device, with an internal device token calculated based on the calculated internal parameter token and a device ID of the safety-critical device to validate the first parameter list such that parameterization of the safety-critical device is ensured and a speed at which the safety-critical device becomes parameterized is increased;
  wherein the external device token is calculated externally based on a device ID contained in the first parameter list and the external parameter token;
  wherein the internal and external parameter tokens are calculated via a specified calculation function based on parameter ID's and parameter values of the parameters contained in the first parameter list; and
  wherein the first parameter list is stored on an external data carrier and is read out from the external data carrier, which is separate from an external parameterizing apparatus, by a first calculation unit of the external parameterizing apparatus for calculation of the external parameter token.

12. A parameterizing apparatus for parameterizing a safety-critical device in a manner which ensures parameterization occurs and which increases a speed at which the device becomes parameterized, wherein the parameterizing apparatus, based on a stored first parameter list, is configured to calculate an external parameter token and an external device token of the safety-critical device which is to be parameterized, wherein the external device token calculated externally by the parameterizing apparatus, in an event of a match between the external parameter token and an internal parameter token calculated internally by the safety-critical device which is to be parameterized, based on the first parameter list, is input into the safety-critical device which is to be parameterized to validate the first parameter list to ensure the parameterization occurs and to ensure the speed at which the safety-critical device becomes parameterized is increased;
  wherein the parameterizing apparatus includes a calculation unit for the calculation of the external parameter token via a specified calculation function, based on parameter ID's and parameter values of parameters contained in the first parameter list and for calculation of the external device token of the device which is to be parameterized, based on the external parameter token and a device ID, contained in the first parameter list, of the device which is to be parameterized; and
  wherein the first parameter list is stored on an external data carrier and is read out from the external data carrier, which is separate from the parameterizing apparatus, by the first calculation unit of the parameterizing apparatus for the calculation of the external parameter token.

13. The parameterizing apparatus as claimed in claim 12, wherein the parameterizing apparatus further includes a display provided for display of the calculated external parameter token and the calculated external device token.

14. The parameterizing apparatus as claimed in claim 13, wherein the parameterizing apparatus includes a reader facility for reading out the first parameter list stored on the external data carrier, and a transfer facility for transferring the calculated external device token to the device which is to be parameterized.

15. The parameterizing apparatus as claimed in claim 12, wherein the parameterizing apparatus is a portable mobile parameterizing device which includes an interface for reading out the first parameter list from the external data carrier, said portable mobile parameterizing device being connectable to the interface, and includes a display for displaying the external parameter token calculated based on the first parameter list, and the calculated external device token, for a user; and wherein the user, in an event of a match between the parameter token displayed and a parameter token output by the device which is to be parameterized, one of (i) manually inputs the external device token displayed on the display of the parameterizing apparatus into the device which is to be parameterized, in order to validate the first parameter list and (ii) transfers the external device token displayed on the display of the parameterizing apparatus to the device which is to be parameterized.

* * * * *